United States Patent
Liu et al.

(10) Patent No.: US 7,064,474 B2
(45) Date of Patent: Jun. 20, 2006

(54) CARBON NANOTUBE ARRAY AND FIELD EMISSION DEVICE USING SAME

(75) Inventors: Liang Liu, Beijing (CN); ShouShan Fan, Beijing (CN)

(73) Assignees: Tsinghua University, Beijing (CN); Hon Hai Precision Ind. Co., Ltd., Taipei Hsien (TW)

( * ) Notice: Subject to any disclaimer, the term of this patent is extended or adjusted under 35 U.S.C. 154(b) by 146 days.

(21) Appl. No.: 10/400,237

(22) Filed: Mar. 26, 2003

(65) Prior Publication Data

US 2004/0095050 A1    May 20, 2004

(30) Foreign Application Priority Data

Nov. 14, 2002  (CN) ................................ 02 1 51997

(51) Int. Cl.
    *H01J 1/304*    (2006.01)

(52) U.S. Cl. ...................... 313/309; 313/310; 313/351
(58) Field of Classification Search ................ 313/309, 313/310, 336, 351, 355, 495; 438/20; 445/24
    See application file for complete search history.

(56) References Cited

U.S. PATENT DOCUMENTS

| 6,283,812 B1* | 9/2001 | Jin et al. ....................... 445/24 |
| 6,440,763 B1* | 8/2002 | Hsu ............................ 438/20 |
| 6,538,367 B1* | 3/2003 | Choi et al. ................... 313/309 |
| 6,741,019 B1* | 5/2004 | Filas et al. ................... 313/355 |

\* cited by examiner

*Primary Examiner*—Nimeshkumar D. Patel
*Assistant Examiner*—Matt Hodges
(74) *Attorney, Agent, or Firm*—Wei Te Chung

(57) ABSTRACT

A field emission device includes a substrate (11) and a carbon nanotube array (12) formed thereon. Carbon nanotubes (120) of the carbon nanotube array are parallel to each other and cooperatively form a plurality of substantially rod-shaped lower portions (121, 121') and a plurality of corresponding tapered tips (122, 122') above the lower portions. Each lower portion and tapered tips have a plurality of carbon nanotubes. Distances between adjacent tips are approximately uniform, and are more than one micrometer. Preferably, the distance is in the range from 1 to 30 micrometers. The field emission device with this structure has reduced shielding between adjacent carbon nanotubes and has decreased threshold voltage required for field emission by the carbon nanotubes. The field emission device also contributes to an improved field emission concentration and efficiency.

17 Claims, 4 Drawing Sheets

CARBON NANOTUBE ARRAY AND FIELD EMISSION DEVICE USING SAME

BACKGROUND OF THE INVENTION

1. Field of the Invention

The present invention relates to a field emission device, and more particularly to a field emission device using carbon nanotubes. The application relates to a contemporaneously filed application having the same applicant and the same assignee with the instant invention, and titled "METHOD FOR PROCESSING ONE-DIMENSIONAL NANO-MATERIALS".

2. Description of Prior Art

Carbon nanotubes were first discovered and reported in an article by Sumio Iijima entitled "Helical Microtubules of Graphitic Carbon" (Nature, Vol. 354, Nov. 7, 1991, pp. 56–58). Carbon nanotubes have superior electron emission capability at low emission voltages, generally less than 100 volts. Furthermore, carbon nanotubes can carry high electric currents reliably. Due to these properties, carbon nanotubes are considered to be an ideal field emission material for applications in a variety of display devices including flat panel displays, such as field emission displays.

Existing carbon nanotube synthesis techniques include arc discharge, laser vaporization, and chemical vapor deposition (CVD). Carbon nanotubes formed by any of these methods alone cannot satisfactorily be used as field emission material for the following reasons. Carbon nanotubes formed using the arc discharge and laser vaporization methods have non-uniform heights and orientations, and are prone to be tangled together. If the carbon nanotubes are directly used as field emission material, they tend to reduce field concentration and field efficiency. Carbon nanotubes formed using the chemical vapor deposition method have uniform height and are well aligned. However, the high density of carbon nanotubes formed is inclined to induce shielding between adjacent carbon nanotubes. In addition, cavities at the tips of carbon nanotubes are encapsulated by catalytic metal particles, thereby reducing field concentration and efficiency.

For carbon nanotubes to be successfully applied in electronic devices, their electron emission properties must be optimized. This can be done by processing the carbon nanotubes. Many techniques have been devised to improve the field concentration and efficiency of carbon nanotubes. These techniques include opening the tips of the carbon nanotubes, purifying the carbon nanotubes, and re-orienting the carbon nanotubes.

A method for opening tips of carbon nanotubes and purifying the carbon nanotubes is disclosed in China patent application CN1292354A. FIG. 7 is a schematic sectional illustration of the method, in which a laser beam is used to open the tips and purify the carbon nanotubes. The method includes the following steps: (1) aligning crude carbon nanotubes 112 perpendicularly on a substrate 110; (2) irradiating the crude carbon nanotubes 112 with a laser beam 140 generated by a laser generator 144, the irradiation occurring at a predetermined height in a direction parallel to a major surface of the substrate 110 to cut off the tips from the crude carbon nanotubes 112; and (3) removing the tips from the crude carbon nanotubes 112. However, the laser generator 144 must be accurately adjusted to ensure that the crude carbon nanotubes 112 are irradiated by the laser beam 140 at the correct height. This makes the method unduly time-consuming. Furthermore, after processing, the carbon nanotubes being used as a field emission device are still densely configured. This induces shielding between adjacent carbon nanotubes, reduces field concentration and efficiency, and increases a threshold voltage of field emission.

SUMMARY OF THE INVENTION

In view of the above-described drawbacks, an object of the present invention is to provide a field emission device using carbon nanotubes which has reduced shielding between adjacent carbon nanotubes.

Another object of the present invention is to provide a field emission device using carbon nanotubes which has a decreased field emission threshold voltage thereof.

A further object of the present invention is to provide a field emission device using carbon nanotubes which has improved field emission concentration and efficiency.

In order to achieve the objects set out above, a field emission device in accordance with a preferred embodiment of the present invention comprises: a substrate and a carbon nanotube array formed thereon, carbon nanotubes of the carbon nanotube array being parallel to each other and cooperatively forming a plurality of substantially rod-shaped lower portions and a plurality of corresponding tapered tips above the lower portions, each lower portion and tapered tip comprising a plurality of carbon nanotubes, wherein distances between adjacent tips are approximately uniform, and are more than one micrometer. Preferably, the distance is in the range from 1 to 30 micrometers. The lower portions have an average diameter in the range from 1 to 30 micrometers. Distal ends of the tapered tips have an average diameter in the range from 10 to 100 nanometers. The tips have an average length of approximately 30 micrometers.

Other objects, advantages and novel features of the present invention will become more apparent from the following detailed description when taken in conjunction with the accompanying drawings, in which:

DETAILED DESCRIPTION OF PREFERRED EMBODIMENTS OF THE INVENTION

Figure 1:
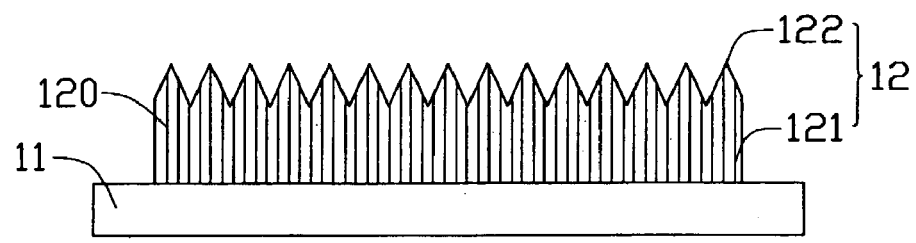
FIG. 1 is a schematic sectional view of a field emission device in accordance with a preferred embodiment of the present invention.

Referring to FIG. 1, a field emission device in accordance with a preferred embodiment of the present invention comprises a substrate 11 and a carbon nanotube array 12 formed thereon. The substrate 11 can be made of glass, silicon, alumina or another suitable material. The carbon nanotube array 12 can be formed by growing them on the substrate 11 directly, or by transplanting pre-prepared carbon nanotubes onto the substrate 11. Carbon nanotubes 120 of the carbon nanotube array 12 are substantially parallel to each other, and are each substantially perpendicular to the substrate 11. The carbon nanotubes 120 cooperatively form a plurality of lower portions 121 and a plurality of corresponding tapered tips 122 above the lower portions 121. Each lower portion 121 and tapered tip 122 comprises a plurality of carbon nanotubes 120. Each tip 122 is oriented substantially perpendicular to the substrate 11. Distances between adjacent tips 122 are approximately uniform, and are more than one micrometer. Preferably, the distance is in the range from 1 to 30 micrometers. This reduces shielding between adjacent carbon nanotubes 120. The tips 122 also contribute to a decreased threshold voltage required for field emission by the carbon nanotubes 120.

Figure 2:
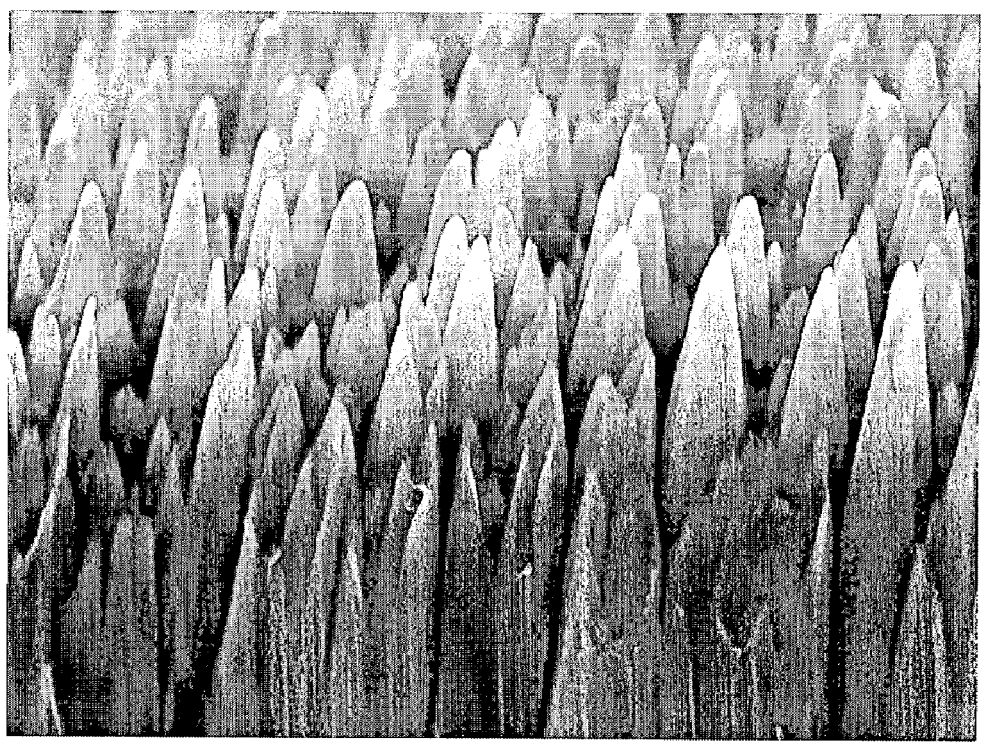
FIG. 2 shows an SEM image of a carbon nanotube array of FIG. 1.

Referring to FIG. 2, this is an SEM image of the carbon nanotube array 12 of FIG. 1. As can be seen, each of the lower portions 121 has a rod-shaped microstructure with an average diameter in the range from 1 to 30 micrometers. Distal ends of the corresponding tapered tips 122 have an average diameter in the range from 10 to 100 nanometers. The tips 122 have an average length of approximately 30 micrometers. Distances between adjacent tips 122 are approximately uniform, and the distance is more than one micrometer. Preferably, the distance is in the range from 1 to 30 micrometers.

Figure 3:
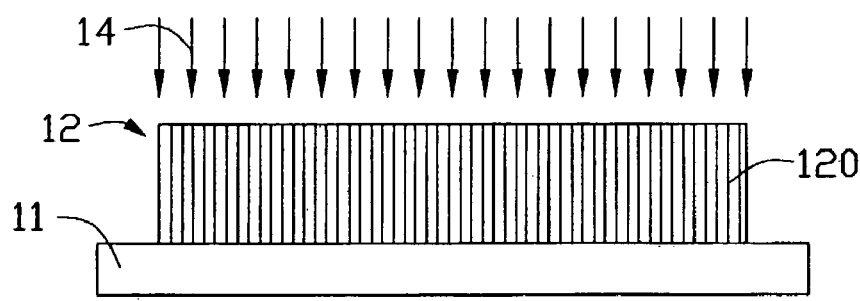
FIG. 3 is a schematic sectional view of a method for preparing the field emission device of FIG. 1 by applying physical energy to the carbon nanotube array formed on a substrate.

Referring also to FIG. 3, the field emission device of FIG. 1 is formed by applying physical energy 14 to a top surface, cooperatively defined by the carbon nanotubes 120 distal from the substrate 11, along a direction perpendicular to the substrate 11.

Generally, the irradiation of the physical energy 14 is performed under the protection of an ambient gas (not shown). The ambient gas can be nitrogen, hydrogen, a gas only partially containing oxygen, or any suitable combination thereof. A gas only partially containing oxygen should not pose any appreciable risk of oxygen burnout of the carbon nanotubes 120, even at room temperature. It is necessary to keep a pressure of the ambient gas greater than 0.2 standard atmospheric pressure, and preferably in the range from 0.5 to 1.5 standard atmospheric pressure. This facilitates formation of the carbon nanotubes 120 such that they have a desired shape.

Generally, the physical energy 14 is applied by means of a high-energy pulse laser beam 14. The laser beam 14 is generated by an excimer laser generator. A preferred wavelength of the laser beam 14 is 308 nanometers. This irradiation of the carbon nanotubes 120 is performed in air at less than 1 standard atmospheric pressure, and at room temperature. A power of each pulse of the laser beam 14 is 150 millijoules. An area of irradiation by the laser beam 14 is 0.5 square centimeters. Preferably, twenty pulses are applied to the carbon nanotubes 120. A thin layer of the top surface of the carbon nanotubes 120 is burned off by the laser beam 14. Catalyst particles adhering to the carbon nanotubes 120 and byproducts such as amorphous carbon deposited on outer walls of the carbon nanotubes 120 are also removed. The application of the laser beam 14 also contributes to rapid expansion of air contained in gaps between upper portions of the carbon nanotubes 120. The upper portions have a length of several tens of micrometers. The rapid expansion of the air presses the upper portions of adjacent carbon nanotubes 120 against each other, to form sharp, tapered tips 122 (see FIG. 1). The laser beam 14 is then switched off.

Generally, it is necessary to prevent the air contained in the gaps between the upper portions of the carbon nanotubes 120 from expanding too much or too quickly. Otherwise, connections between the carbon nanotubes 120 and the substrate 11 may be impaired or broken. Accordingly, an intensity of the laser beam 14 can be reduced, and a number of pulses of the laser beam 14 can be increased to more than 20. These conditions yield carbon nanotubes 120 having the above-described tips 122. Under these conditions, the risk of connections between the carbon nanotubes 120 and the substrate 11 being impaired or broken is minimized.

Figure 4:
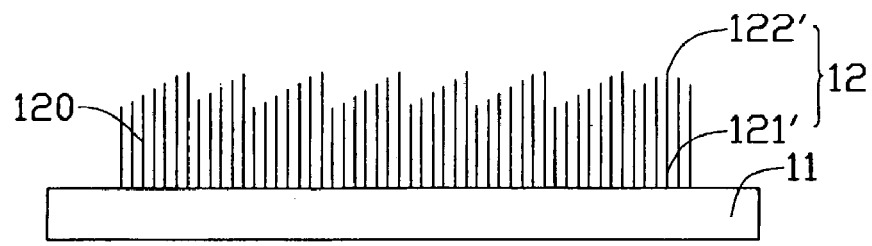
FIG. 4 is a schematic sectional view of a field emission device in accordance with an alternative embodiment of the present invention.

Referring to FIG. 4, a field emission device in accordance with an alternative embodiment of the present invention comprises the substrate 11 and a carbon nanotube array 12 formed thereon. Carbon nanotubes 120 of the carbon nanotube array 12 are substantially parallel to each other, and are each substantially perpendicular to the substrate 11. The carbon nanotubes 120 cooperatively form a plurality of lower portions 121' and a plurality of corresponding slanted, tapered tips 122' above the lower portions 121'. Each lower portion 121' and tapered tip 122' comprises a plurality of carbon nanotubes 120. The tips 122' are substantially parallel to each other and are oriented along an angle relative to an imaginary line that is perpendicular to the substrate 11. The angle is in the range from zero to thirty-five degrees. Preferably, the angle is thirty degrees. Distances between adjacent tips 122' are approximately uniform, and are more than one micrometer. Preferably, the distance is in the range from 1 to 30 micrometers. This reduces shielding between carbon nanotubes 120. The tips 122' also contribute to a decreased threshold voltage required for field emission by the carbon nanotubes 120.

Figure 5:
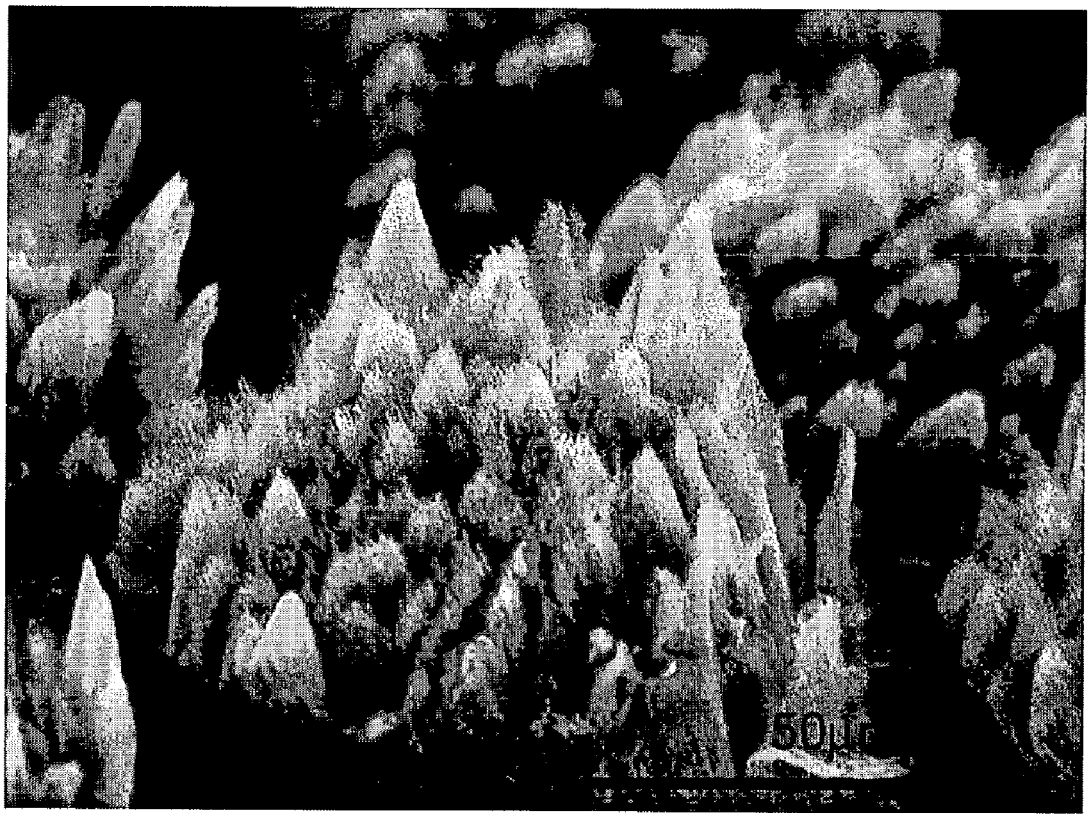
FIG. 5 shows an SEM image of an alternative embodiment of the carbon nanotube array of FIG. 4.
Figure 7:
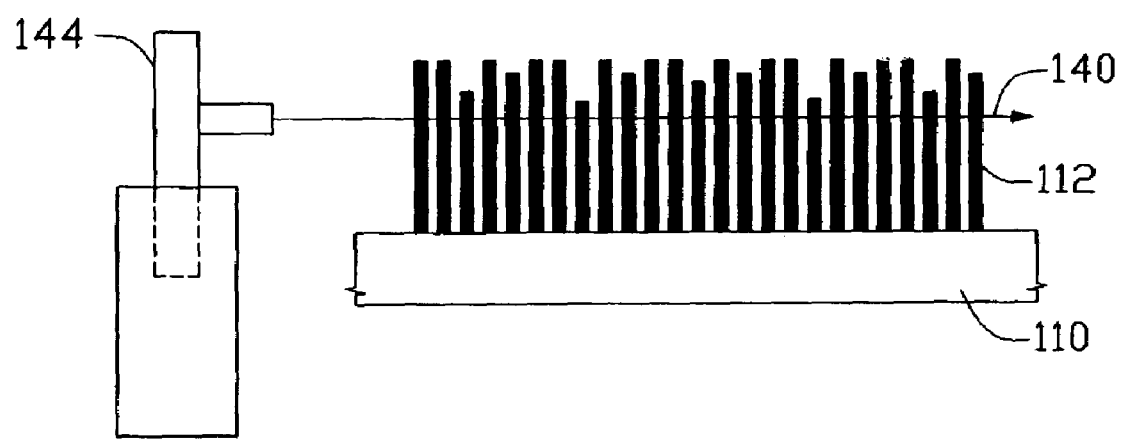
FIG. 7 is a schematic sectional illustration of a conventional method for opening tips of and purifying carbon nanotubes.

FIG. 5 shows an SEM image of the alternative carbon nanotube array of FIG. 4 according to the present invention. As can be seen, each of the lower portions 121' comprises a rod-shaped microstructure with an average diameter in the range from 1 to 30 micrometers. Distal ends of the corresponding slanted tapered tips 122' have an average diameter in the range from 10 to 100 nanometers. The tips 122' have an average length of approximately 30 micrometers. Distances between adjacent tips 122' are approximately uniform, and the distance is more than one micrometer. Preferably, the distance is in the range from 1 to 30 micrometers.

Figure 6:
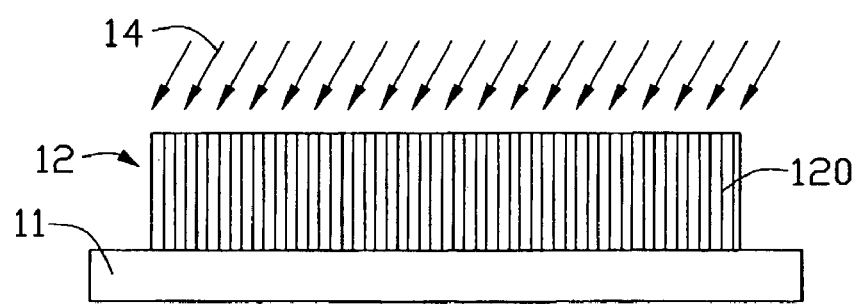
FIG. 6 is a schematic sectional view of a method for preparing the field emission device of FIG. 4 by applying physical energy to the carbon nanotube array formed on the substrate.

Referring to FIG. 6, the alternative field emission device of FIG. 4 is prepared by a method similar to the above-described method for preparing the preferred field emission device of FIG. 1. However, the laser beam 14 irradiates the top surface of the carbon nanotube array 12 at an angle relative to the imaginary line that is perpendicular to the substrate 11. In principle, a maximum such angle is determined by the pressure of the ambient gas, which in turn is proportional to a density of the carbon nanotubes 120. When the angle is greater than the maximum angle, it is difficult to form the sharp, tapered tips 122' on the carbon nanotubes 120. Generally, the maximum angle is in the range from zero to thirty-five degrees. Preferably, the angle is thirty degrees. When twenty pulses of the laser beam are applied to the carbon nanotubes 120, the sharp, tapered tips 122' are formed on the carbon nanotubes 120. The angle of slanting of the tips 122' is substantially the same as the angle at which the laser beam 14 irradiated the carbon nanotubes 120. That is, the slant of the tips 122' is substantially parallel to the direction in which the laser beam 14 irradiated the carbon nanotube array 12.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A carbon nanotube array comprising:
a plurality of carbon nanotubes, the carbon nanotubes being parallel to each other and cooperatively forming a plurality of lower portions and a plurality of corresponding tapered tips above the lower portions;
wherein distances between adjacent tips are approximately uniform, and the distance is more than one micrometer.

2. The carbon nanotube array as described in claim 1, wherein the distances between adjacent tips are in the range from 1 to 30 micrometers.

3. The carbon nanotube array as described in claim 1, wherein the lower portions have rod-shaped mirostructures with an average diameter in the range from 1 to 30 micrometers.

4. The carbon nanotube array as described in claim 1, wherein each of the plurality of tips comprises a plurality of carbon nanotubes.

5. The carbon nanotube array as described in claim 4, wherein distal ends of the plurality of tips have an average diameter in the range from 10 to 100 nanometers.

6. The carbon nanotube array as described in claim 4, wherein the plurality of tips has an average length of approximately 30 micrometers.

7. The carbon nanotube array as described in claim 1, wherein the plurality of tips are formed by applying physical energy to a top surface cooperatively defined by the carbon nanotubes.

8. The carbon nanotube array as described in claim 7, wherein the physical energy is applied by means of a pulse laser beam.

9. The carbon nanotube array as described in claim 7, wherein the plurality of tips are parallel to each other and oriented in a direction parallel to a direction of the irradiation by the physical energy.

10. The carbon nanotube array as described in claim 9, wherein the plurality of tips have an angle of slanting in the range from zero to thirty-five degrees relative to an imaginary line that is perpendicular to a substrate on which the carbon nanotubes formed.

11. A field emission device comprising:
a substrate; and
a plurality of carbon nanotubes formed on the substrate, the carbon nanotubes being parallel to each other and substantially perpendicular to the substrate, the carbon nanotubes cooperatively forming a plurality of tapered tips distal from the substrate;
wherein distances between adjacent tips are approximately uniform, and the distance is more than one micrometer.

12. The field emission device as described in claim 11, wherein the distances between adjacent tips are in the range from 1 to 30 micrometers.

13. The field emission device as described in claim 11, wherein the carbon nanotubes further comprise a plurality of lower portions adjacent the substrate, each lower portion has a rod-shaped microstructure with an average diameter in the range from 1 to 30 micrometers.

14. The field emission device as described in claim 11, wherein each of the plurality of tips comprises a plurality of carbon nanotubes.

15. The field emission device as described in claim 11, wherein the plurality of tips parallel to each other and have a direction of substantially perpendicular to the substrate.

16. The field emission device as described in claim 11, wherein the plurality of tips parallel to each other and have an angle of slanting relative to an imaginary line that is perpendicular to the substrate.

17. The field emission device as described in claim 16, wherein the angle is in the range from one degree to thirty-five degrees.

* * * * *